J. W. D. Patten.
Strawberry Huller.

No. 104,919.   Patented June 28, 1870.

Witnesses.   Inventor.

United States Patent Office.

JULIA W. D. PATTEN, OF WASHINGTON. DISTRICT OF COLUMBIA.

Letters Patent No. 104,919, dated June 28, 1870.

IMPROVED STRAWBERRY-HULLER.

The Schedule referred to in these Letters Patent and making part of the same

I, JULIA W. D. PATTEN, of the city of Washington, District of Columbia, have invented a new Strawberry and Fruit-Huller, of which the following is a specification.

My invention relates to a device or instrument for firmly holding certain fruits, and another instrument for removing the hulls or other unedible portion of said fruits while so retained or held in position by the instrument first referred to.

By the combined use of these instruments the fruit is protected from the injury and soiling often caused by handling, and the fingers are protected from the staining, roughening, and other disagreeable effects generally resulting from the contact of the fingers with the juices and acids of fruits.

Figure 1:
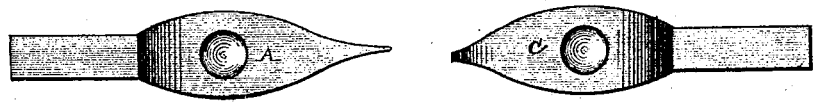
Figure 2:

Figure 1 is the plan view of the two instruments.
Figure 2 is the side view of the same.
A and B represent the fruit-holder,
C and D, the fruit-cutter, in the positions referred to.

The berry-huller is constructed somewhat like a pair of tweezers, the sides or blades being made elastic near their point of junction, that they may readily return to their position after being compressed in their operation.

The arms or blades of the cutter are bent inward toward each other, near their extremities, at a right or slightly obtuse angle, and the bent portion terminates in a cutting or clipping edge, either straight or curved.

It is apparent that, when the cutting ends are placed or inserted just below or at the base of the hull or calyx of the fruit, and then brought together by pressure, the hull will be readily separated.

The berry-holder is similar in its general construction, but differs from the cutter in not being provided with cutting ends or faces, the arms or sides terminating in sharp points.

These pointed ends are intended to pierce the fruit, and when, in that position, they are pressed slightly toward each other, the fruit is easily held in a position for the application of the cutting instrument.

The pointed ends are made sharp, thin, and straight, so that no laceration of the fruit will be caused either in their insertion or withdrawal.

It will be evident from the above description that the process of hulling strawberries and other fruit can be accomplished by my invention without applying the fingers directly to the fruit, and that thereby the double advantage is gained of protecting the fruit from the soiling touch and hurtful pressure of the fingers, and also of protecting the fingers from the annoying and sometimes painful effect of the fruit-juices and acids.

This instrument can also be applied in the process of removing the skin or peel from other fruits, as the fresh fig, the milky juice of which has a very irritating effect upon the skin.

Claim.

I claim the combination of the cutting or clipping instrument and the holding instrument, constructed and operating as and for the purposes herein set forth.

JULIA W. D. PATTEN.

Witnesses:
EDM. F. BROWN,
F. FOWLER.